(12) United States Patent
Haudenschild et al.

(10) Patent No.: US 8,549,026 B2
(45) Date of Patent: *Oct. 1, 2013

(54) STANDARDIZED DATABASE ACCESS SYSTEM AND METHOD

(75) Inventors: Chris Haudenschild, La Jolla, CA (US); Senmao Lin, San Diego, CA (US); Yumin Chen, San Diego, CA (US)

(73) Assignee: CliniComp International, Inc., San Diego, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 12/902,800

(22) Filed: Oct. 12, 2010

(65) Prior Publication Data

US 2012/0089583 A1    Apr. 12, 2012

(51) Int. Cl.
*G06F 17/30*    (2006.01)

(52) U.S. Cl.
USPC .......................... 707/760; 707/756; 707/779

(58) Field of Classification Search
USPC ........................................ 707/756, 760, 779
See application file for complete search history.

(56) References Cited

U.S. PATENT DOCUMENTS

| | | | |
|---|---|---|---|
| 5,829,006 A | 10/1998 | Parvathaneny et al. | |
| 6,016,497 A | 1/2000 | Suver | |
| 6,021,405 A | 2/2000 | Celis et al. | |
| 6,119,126 A | 9/2000 | Yee et al. | |
| 6,223,227 B1 | 4/2001 | Williamson et al. | |
| 6,571,232 B1 | 5/2003 | Goldberg et al. | |
| 6,604,135 B1* | 8/2003 | Rogers et al. | 709/217 |
| 6,732,094 B1 | 5/2004 | Cousins et al. | |
| 6,804,723 B1 | 10/2004 | Horikiri | |
| 7,644,066 B2 | 1/2010 | Krishnaprasad et al. | |
| 2003/0105811 A1 | 6/2003 | Laborde et al. | |
| 2003/0187831 A1 | 10/2003 | Bestgen et al. | |
| 2003/0208493 A1 | 11/2003 | Hall et al. | |
| 2004/0024653 A1* | 2/2004 | Edgardo et al. | 705/26 |
| 2005/0033743 A1* | 2/2005 | Robinson et al. | 707/9 |
| 2005/0131901 A1* | 6/2005 | Richter | 707/10 |
| 2006/0064623 A1 | 3/2006 | Fischer et al. | |
| 2006/0173873 A1 | 8/2006 | Prompt et al. | |
| 2009/0018999 A1* | 1/2009 | Petri | 707/3 |
| 2009/0019000 A1 | 1/2009 | Arends et al. | |
| 2009/0125882 A1* | 5/2009 | Frigo et al. | 717/116 |
| 2009/0129755 A1 | 5/2009 | Rakib et al. | |
| 2009/0187344 A1 | 7/2009 | Brancaccio et al. | |

* cited by examiner

*Primary Examiner* — Khanh Pham
(74) *Attorney, Agent, or Firm* — Bernard L. Kleinke, Esq.; Duckor Spradling Metzger & Wynne

(57) ABSTRACT

One embodiment of the present invention relates to a technique for accessing data from a database. The technique may include providing a group of hyper objects each containing a different rule. When a hyper object query language (HOQL) query is received using an HOQL engine, at least one hyper object is selected using the HOQL engine in response to the HOQL query, A data request is sent via the selected hyper object to retrieve data from the database, to be received from the database to be used by the selected hyper object. The requested data is used according to the rule associated with the selected hyper object to provide a desired standardized output.

33 Claims, 2 Drawing Sheets

STANDARDIZED DATABASE ACCESS SYSTEM AND METHOD

FIELD OF THE INVENTION

The present invention relates in general to a database administration system and method. It more particularly relates to such a system and method useful for managing and accessing data in a native database.

BACKGROUND ART

There is no admission that the background art disclosed in this section legally constitutes prior art.

There have been many different types and kinds of database systems. For example, reference may be made to U.S. Pat. Nos. 5,829,006, 6,016,497, 6,119,126, 6,223,227, 6,571, 232 and 7,644,066, and U.S. patent application publications 2003/0105811, 2003/0208493, 2006/0173873, and 2009/0187344.

Electronic databases have been known and used for many years. A given native database such as a given populated relational database may require modification, such as a change in the schema for the data base. In so doing, it would be necessary to provide additional changes and modifications to the access method for the database to enable the same or similar reports or other outputs to be generated. The same would be true if the type of database structure were to be changed. In this regard, changes and modifications would also be required to maintain consistent reports and other output from the system.

It would be desirable to have a standardized database access system which can generate standardized outputs, such as reports, from a native database even after the schema or the format of the database is modified or replaced.

BRIEF DESCRIPTION OF THE DRAWINGS

The features of this invention and the manner of attaining them will become apparent, and the invention itself will be best understood by reference to the following description of certain embodiments of the invention taken in conjunction with the accompanying drawings, wherein.

DETAILED DESCRIPTION OF CERTAIN EMBODIMENTS OF THE INVENTION

Figure 1:
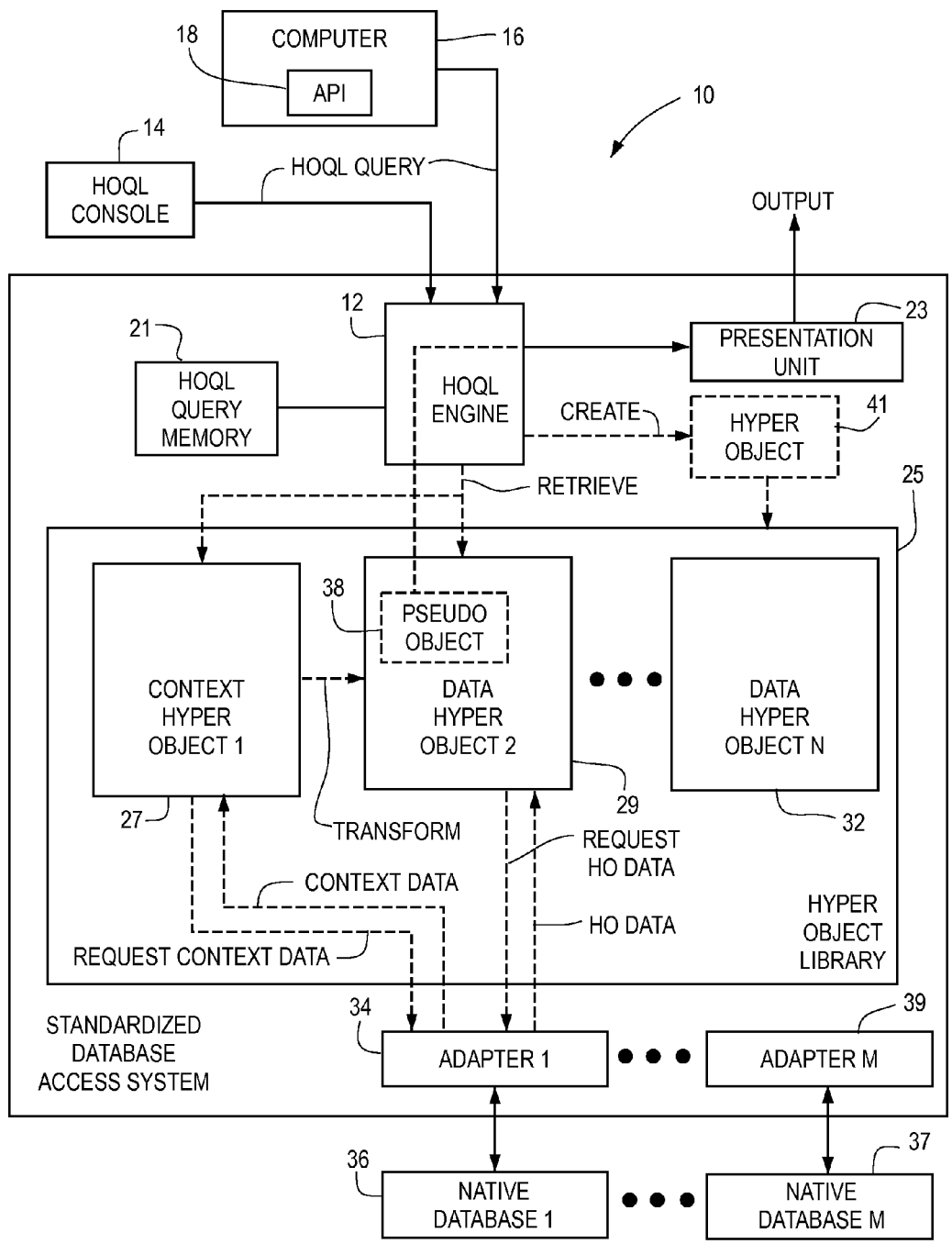
FIG. 1 is a block diagram of a standardized database accessing system constructed according to an embodiment of the invention.

It will be readily understood that the components of the embodiments as generally described and illustrated in the drawings herein, could be arranged and designed in a wide variety of different configurations. Thus, the following more detailed description of certain ones of the embodiments of the system, components and method of the present invention, as represented in the drawings, is not intended to limit the scope of the invention, as claimed, but is merely representative of the embodiments of the invention.

According to at least some of the embodiments of the present invention, the standardized database access system and method enable standardized outputs such as reports, displays and others to be produced, independently of the underlying database employed. In this manner, a native database can be utilized for producing desired standardized reports and other such output, independently of the schema or data structure of a given database. Also, the same standardized reports or other output can be readily created even though a change is made in the schema and/or the database structure.

There is disclosed a standardized database access system and method. One embodiment of the present invention relates to a technique for accessing data from a database. The technique may include providing a group of hyper objects each containing a different rule. A hyper object is similar to a conventional object, except that it does not contain or store data, only rules for accessing data from a separate database. When a hyper object query language (HOQL) query is received using an HOQL engine, at least one hyper object is selected using the HOQL engine in response to the HOQL query. A data request is sent via the selected hyper object to retrieve data from the database, to be received from the database to be used by the selected hyper object. The requested data is used according to the rule associated with the selected hyper object to provide a desired output.

Thus, according to certain embodiments of the present invention, the standardized database access system and method can be utilized for different native databases for creating standardized outputs in response to HOQL queries which are similar to familiar SQL queries, independently of changes to database formulation or schema.

The standardized database access system provides management function such as creating, storing, deleting or listing hyper objects. It also provides for data access functions of retrieving, storing and updating hyper objects. The hyper objects include both data objects and context objects. The context objects determine for the data hyper objects certain environment or configuration of the information requested responsive to a query.

The data accessed by the hyper object may be interpreted by the use of a context hyper object. The context hyper object may take into account time, location, and/or other, which may change the perspective of data accessed. For example, a normal drug dose may change dramatically for a neonate as compared to an adult, demonstrating the importance of the context of age.

The context hyper object could cause a context portion of a rule of one or more data objects to be transformed accordingly to facilitate the search. Such an approach may be particularly useful where many native database/schema combinations are employed and standardized outputs are desired.

Referring now to FIG. 1 of the drawings, there is shown a database access system constructed in accordance with an embodiment of the present invention and is generally indicated at 10. As shown in FIG. 1, the standardized database access system 10 may include a hyper object query language (HOQL) engine 12 for receiving a HOQL query from either a HOQL console 14 or a computer 16 utilizing an application programming interface (API) 18. The HOQL engine 12 may utilize an HOQL query memory 21 for storing the HOQL queries. A presentation unit 23 presents standardized output to the user in various forms such as printed reports, displays and others. A hyper object library 25 containing a group of hyper objects, such as hyper objects 27, 29, and 32, for responding to the HOQL queries. The hyper objects may then access and manipulate data requested and received from a group of native databases such as a native database 36 and a native database 37 via an adapter 34 and an adapter 39, respectively. The presentation unit 23 presents standardized outputs to the user in the various forms in response to the HOQL engine 12 as hereinafter described in greater detail.

The hyper objects may each include different rules for requesting access to data in the database and rules for manipulating the data received from the database. The hyper objects may not store data. Each one of the rules in the hyper objects may include functional manipulations, logical decisions, and context transformations.

The hyper object library 25 may include at least one context hyper object, such as a context hyper object 27, and a plurality of data hyper objects, such as data hyper objects 29 and 32. The context hyper object 27 may include rules that may be used to request context data and receive the requested context data from the database 36 via the adapter 34. The context data may include information regarding the context or environment specified in the search query. Upon receiving and manipulating the requested context data using its rules, the context hyper object 27 may then provide a transform command to one or more of the selected data hyper objects, such as data hyper object 29.

The data hyper object 29 may then utilize a transformation portion of its rules. This transformation portion may include additional and/or specific rules regarding the context or environment specified in the search query. The data hyper objects, such as data hyper object 29, may be used to request hyper object data and receive the requested hyper object data from the database 36 via the adapter 34. Upon receiving and manipulating the requested hyper object data using its rules, the data hyper object 29 may then appear as a pseudo object, such as pseudo object 38, to the HOQL engine 12 and provide a standardized output, such as a report, to the presentation unit 23 via the engine 12.

An example of a context transformation may be initiated by a query, such as the following: "What word corresponds to the number '1' in context of English?" The number '1' may correspond to a number of different words, such as "one", "uno", "ichi", "eins", etc., depending on the language context. In this example, the word "one" may be utilized in the search of the database.

Considering now a context age example, assume the heart rate of a patient is required to be analyzed. The analysis requires the patient's age as a factor in the analysis. In order to determine whether or not a heart rate for a given patient is normal, a context object such as the context hyper object 27 in response to the RETRIEVE signal such a medical analysis retrieval signal regarding a given patient, from the HOQL engine 12, sends a REQUEST CONTEXT DATA signal to the native database 36 via the adapter 34. As a result, a CONTEXT DATA signal such as the age of the patient being two days old, is retrieved from the database 36 via the adapter 34 and provided to the context hyper object 27, which then provides a TRANSFORM signal to the data hyper object 38.

The TRANSFORM signal may then provide context information to the data hyper object 38 to transform its rules to identify the given patient as being a neonate. In this manner, the data hyper object 38 has its rule transformed in such a manner that neonate normal heart rate data information is utilized instead of heart rate information such, for example, as adult heart rate information.

Some context transformations may be accomplished by a data hyper object without the use of a context hyper object, such that a context rule may be embedded in the rules of the data hyper object.

The presentation unit 23 may allow customization of the standardized report for each user. For example, a header including the company's name or other information desired by the user may be added to the report or other desired output.

The database 36 may be a relational database and include one or more databases that require one or more adapters such as the adapter 34. The adapters may be customized for each of the native databases to avoid the need to modify the other components of the system.

The adapters such as the adapter 34 may provide an interface to allow access to the database 36, so that the adapter may be the only component that needs to be modified in order for the system to operate with different databases. Each adapter may match native databases to common rule sets for different raw data. For example, for databases having the colors red, green, and blue, in a first context red may equal 1, green may equal 2, and blue may equal 3. In a second context, red may equal 3, green may equal 1, and blue may equal 2. Therefore, the adapter may provide, if required, the proper translation, depending on the context of the query. The adapters may abstract the different data structures and abstract them as to a standard output.

The HOQL may be implemented in a manner similar to Structured Query Language (SQL) used for relational database queries and may use extensions for specific applications. The syntax for HOQL may be substantially the same or similar to the syntax for SQL, but the actions may be different, such as instructing a first hyper object to command a second hyper object to utilize a transformation portion of its rules in response to a context condition of the query.

The standardized database access system 10 may include both management and data access functions. The management functions may include the ability to create, delete, describe, and list hyper objects. The data access functions may include the ability to retrieve, store, and update data from the database 36.

Figure 2:
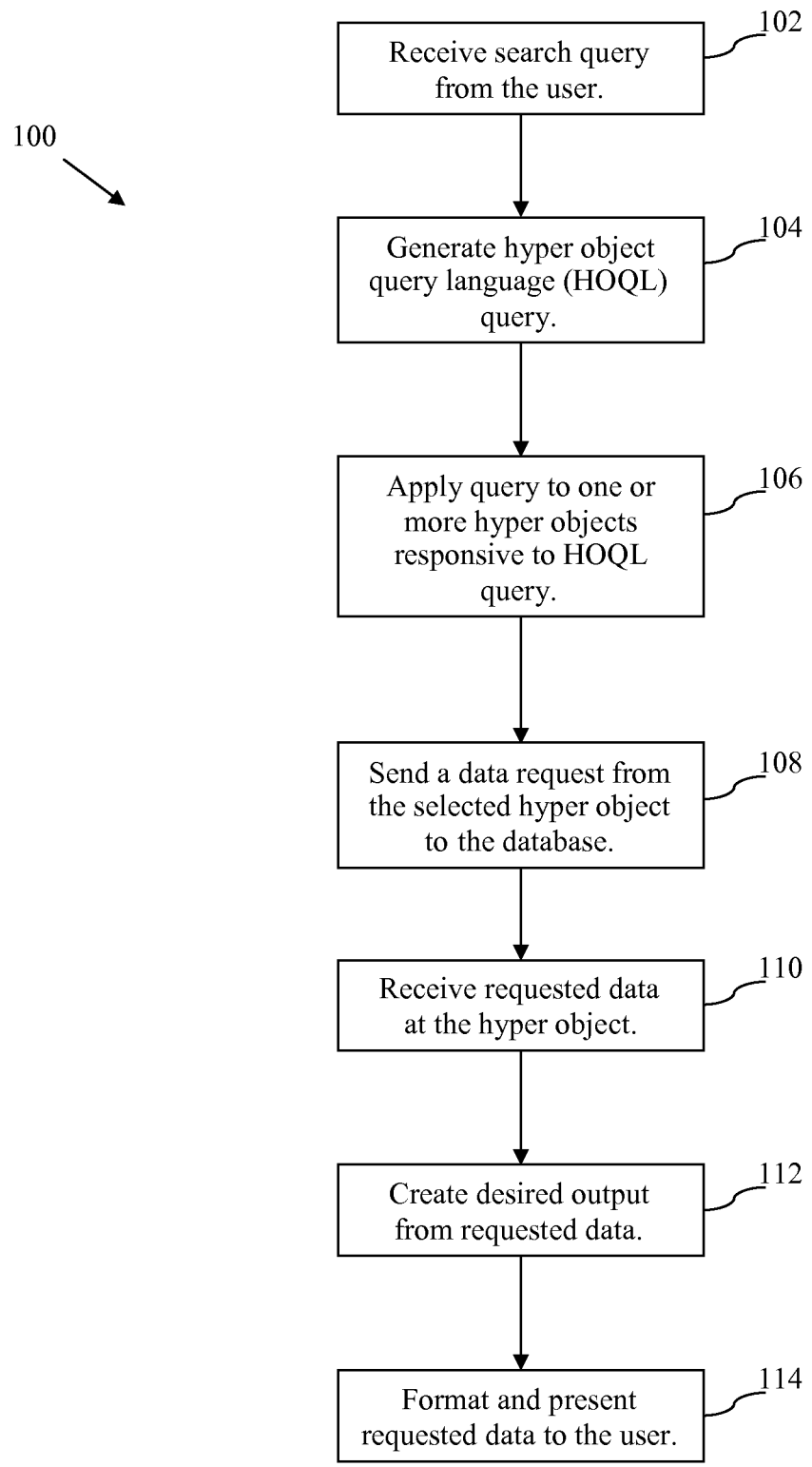
FIG. 2 is a flow chart of a standardized database access method using the system of FIG. 1 according to an embodiment of the invention.

Referring now to FIG. 2, a standardized database access method using the system 10 of FIG. 1 in accordance with an embodiment of the invention is shown and generally referenced as 100. At step 102 a search query inputted by a user using the HOQL console 14 or the computer 16 executing the appropriate API may be received. The query may be for a search, which may be a Boolean search, a natural language search, or other appropriate search.

From this received search query a HOQL query may be generated and provided to the HOQL engine 12 as shown at step 104. At step 106 the HOQL query may include a selection of one or more hyper objects in the hyper object library and instructions on their combination, if necessary. As shown in step 108, the hyper objects may then each send a data request to the database. From this data request to the database, the hyper object may then receive the requested data at step 110. After the requested data is received at the hyper object, the data may be manipulated to create a desired output such as a report or other desired document at step 112. The desired standardized output may include adding specific user information or formatting to the report or document. At step 114 the desired output may be provided to the user at a display on a screen and/or as a printed document, or other.

If both a context hyper object and a data hyper object are selected, the context hyper object may send its context data request to the database prior to the data hyper object sending its hyper object data request to the database. When the context hyper object receives the requested context data from the database, the requested context data may then be manipulated to determine whether or not a transformation portion of the rules of one or more of the data hyper objects should be used in response to the HOQL query. If it is determined that a transformation portion of the rules of one or more of the data hyper objects should be used, a transform command may be sent to the appropriate data hyper objects. A data hyper object that receives the transform command may utilize the desired transformation portion of its rules in response to the transform command and to the query. The data hyper object may then use this transformation portion of its rules to send its hyper object data request to the database and to manipulate the requested hyper object data.

If during the generation of the HOQL query, it is determined that the available hyper objects in the hyper object library 25 are not adequate to respond to the search query from the user, or for any other reason that one or more new hyper objects would be desirable, the HOQL query may instruct the creation of a new hyper object, such as hyper object 41 (FIG. 1). This created hyper object 41 may then be utilized alone or in combination with other hyper objects to respond to the search query or other query as described above regarding FIG. 2. If it is determined that this created hyper object 41 may be useful for subsequent searches, it may be stored in the hyper object library 25 and become available for use by subsequent HOQL queries. It should be noted that the hyper object 41 may be deleted.

While particular embodiments of the present invention have been disclosed, it is to be understood that various different modifications are passing and one contemplated within the true spirit and scope of the appended claims. There is no intention, therefore, of limitations to the exact abstract or disclosure herein presented.

What is claimed is:

1. A standard database access method via a database access system for accessing data from a database, comprising:
   providing a group of hyper objects stored in a hyper object library of the access system, each hyper object containing a different rule and including at least one data hyper object and at least one context hyper object;
   receiving a hyper object query language (HOQL) query concerning certain data stored in the database, using an HOQL engine;
   selecting at least one data hyper object and at least one context hyper object using the HOQL engine in response to the HOQL query;
   the context hyper object including a rule for requesting from the database context data which is a selected portion only of the certain data stored in the database regarding an environment of the certain data;
   requesting context data from the database using the selected context hyper object;
   generating a rule transform command via the selected context hyper object to be used by a transform portion of the selected data hyper object for modifying its rule;
   sending a data request for the database from the selected data hyper object in accordance with its transformed rule to retrieve data from the database;
   receiving the requested data from the database to be used by the selected data hyper object; and
   using the requested data according to the rule associated with the selected hyper object to provide a desired standardized output.

2. The method according to claim 1, further including adapting the data request via an adapter to conform to the structure of a given database, and providing via the adapter the proper translation depending on the context of the HOQL query.

3. The method according to claim 1, further including creating a new hyper object in response to the HOQL.

4. The method according to claim 3, further including storing the new hyper object with the group of hyper objects.

5. The method according to claim 1, wherein the desired standardized output is a report.

6. The method according to claim 5, further including customizing the report using a presentation unit.

7. The method according to claim 1, wherein the HOQL query is received from a HOQL console.

8. The method according to claim 1, wherein the HOQL query is received from an application program interface via a computer.

9. A method according to claim 1, further including updating the hyper objects.

10. A standardized database access method via a database access system, comprising:
    providing a database;
    providing a group of hyper objects stored in a hyper object library of the access system, each containing a different rule and including at least one data hyper object and at least one context hyper object;
    receiving a hyper object query language (HOQL) query concerning certain data stored in the database, using an HOQL engine;
    selecting at least one data hyper object and at least one context hyper object using the HOQL engine in response to the HOQL query;
    the context hyper object including a rule for requesting from the database context data which is a selected portion only of the certain data stored in the database regarding an environment of the certain data;
    requesting context data from the database using the selected context hyper object;
    generating a rule transform command via the selected context hyper object to be used by a transform portion of the selected data hyper object for modifying its rule;
    sending a data request for the database from the selected data hyper object in accordance with its transformed rule to retrieve data from the database;
    receiving the requested data from the database to be used by the selected data hyper object; and
    using the requested data according to the rule associated with the selected hyper object to provide a desired standardized output.

11. The method according to claim 10, further including adapting the data request via an adapter to conform to the structure of a given database, and providing via the adapter the proper translation depending on the context of the HOQL query.

12. The method according to claim 11, wherein the selected data hyper object receives the transform command to utilize the desired transformation portion of its rules in response to the transform command and to the HOQL query.

13. The method according to claim 10, further including creating a new hyper object in response to the HOQL.

14. The method according to claim 13, further including storing the new hyper object with the group of hyper objects.

15. The method according to claim 10, wherein the desired standardized output is a report.

16. The method according to claim 15, further including customizing the report using a presentation unit.

17. The method according to claim 10, wherein the HOQL query is received from a HOQL console.

18. The method according to claim 10, wherein the HOQL query is received from an application program interface in a computer.

19. The method according to claim 10, further including updating the hyper objects.

20. The method according to claim 10, further including determining by using the context hyper object whether or not a transformation portion of the rules of at least one of the data hyper objects should be used in response to the HOQL query.

21. The method according to claim 20, wherein the selected data hyper object receives the transform command to utilize the desired transformation portion of its rules in response to the transform command and to the HOQL query.

22. The method according to claim 21, further including in response to receiving requested data from the database, manipulating the received data by the selected data hyper object in accordance with its rule to serve as a pseudo hyper object to the HOQL engine for providing a standardized output.

23. The method according to claim 22, further including creating, deleting, describing and listing hyper objects for management functions.

24. The method according to claim 23, further including retrieving, storing and updating data from the database for data access functions.

25. A standard database access method via a database access system for accessing data from a database, comprising:
   providing a group of hyper objects stored in a hyper object library of the access system, each hyper object containing a different rule;
   receiving a hyper object query language (HOQL) query concerning certain data stored in the database, using an HOQL engine;
   selecting at least one hyper object using the HOQL engine in response to the HOQL query;
   the hyper object including a rule for requesting from the database certain data stored in the database as specified in the HOQL query;
   requesting data from the database using the selected hyper object;
   sending a data request for the database from the selected hyper object in accordance with the rule of the selected hyper object to retrieve data from the database;
   receiving the requested data from the database to be used by the selected hyper object; and
   using the requested data according to the rule associated with the selected hyper object to provide a desired standardized output.

26. The method according to claim 25, further including adapting the data request via an adapter to conform to the structure of a given database, and providing via the adapter the proper translation depending on the context of the HOQL query.

27. The method according to claim 25, further including creating a new hyper object in response to the HOQL.

28. The method according to claim 27, further including storing the new hyper object with the group of hyper objects.

29. The method according to claim 25, wherein the desired standardized output is a report.

30. The method according to claim 29, further including customizing the report using a presentation unit.

31. The method according to claim 25, wherein the HOQL query is received from a HOQL console.

32. The method according to claim 25, wherein the HOQL query is received from an application program interface via a computer.

33. A method according to claim 25, further including updating the hyper objects.

* * * * *